(12) United States Patent
Lu et al.

(10) Patent No.: US 7,870,167 B2
(45) Date of Patent: Jan. 11, 2011

(54) IMPLEMENTING EVENT PROCESSORS

(75) Inventors: Yanbing Lu, Arcadia, CA (US); Jerry Waldorf, West Hills, CA (US)

(73) Assignee: Oracle America, Inc., Redwood City, CA (US)

( * ) Notice: Subject to any disclaimer, the term of this patent is extended or adjusted under 35 U.S.C. 154(b) by 440 days.

(21) Appl. No.: 11/938,036

(22) Filed: Nov. 9, 2007

(65) Prior Publication Data

US 2009/0125536 A1 May 14, 2009

(51) Int. Cl.
*G06F 7/00* (2006.01)
*G06F 17/30* (2006.01)

(52) U.S. Cl. ........................ 707/803; 707/809
(58) Field of Classification Search .................. 707/101, 707/803, 809
See application file for complete search history.

(56) References Cited

U.S. PATENT DOCUMENTS

| | | | |
|---|---|---|---|
| 6,006,224 A * | 12/1999 | McComb et al. | 707/5 |
| 6,460,043 B1 * | 10/2002 | Tabbara et al. | 707/100 |
| 7,257,611 B1 | 8/2007 | Shankar et al. | |
| 7,383,253 B1 * | 6/2008 | Tsimelzon et al. | 707/3 |
| 7,516,121 B2 * | 4/2009 | Liu et al. | 707/3 |
| 2006/0282301 A1 | 12/2006 | Olson | |
| 2007/0150585 A1 | 6/2007 | Chkodrov | |
| 2007/0288459 A1 * | 12/2007 | Kashiyama et al. | 707/6 |
| 2008/0120283 A1 * | 5/2008 | Liu et al. | 707/4 |
| 2009/0106198 A1 * | 4/2009 | Srinivasan et al. | 707/3 |

OTHER PUBLICATIONS

Arvind Arasu and Shivanth Babu and Jennifer Widom, Stanford University, "The CQL Continuous Query Language: Semantic Foundations and Query Execution", pp. 1-32, Published 2003.

* cited by examiner

*Primary Examiner*—Yicun Wu
*Assistant Examiner*—Pavan Mamillapalli
(74) *Attorney, Agent, or Firm*—Brooks Kushman P.C.

(57) ABSTRACT

Novel techniques for implementing applications, such as event processors ("EPs"), designed in CQL are provided. Event processors, created as a network of CQL operators, can be implemented in SQL. Implementing an event processor in SQL allows the leveraging of significant industry knowledge and experience in research and development of SQL engines. A user can interact with an EP-generator application to design an event processor in CQL. The EP-generator application can implement the event processor by translating the CQL into SQL statements. Event-processing systems can execute the SQL implementation of the event processor in a first computing environment, such as an SQL database. In this manner, systems described herein can execute event processors defined as a network of CQL operators with high performance and scalability.

18 Claims, 6 Drawing Sheets

---

200

202
CQL Operator: time-based-window(T) where T is a time period over $\tau$

Let S be a stream with schema K and time-domain $\tau$, and time-based-window(T) takes S as an input stream and computes relation R such that R = time-based-window(T)(S).

204

206
SQL Representation of CQL operator

Let S' be the SQL representation of the input stream S. The SQL representation of R is computed as follows:

For each t that is an element of $\tau$,
INSERT INTO R'
    SELECT s, '+', t FROM S' WHERE f(s, t) > 0
    UNION
    SELECT s, '-', (t + T) FROM S' WHERE f(s, t) > 0

202

CQL Operator: time-based-window(T) where T is a time period over $\mathcal{T}$

Let S be a stream with schema K and time-domain $\mathcal{T}$, and time-based-window(T) takes S as an input stream and computes relation R such that R = time-based-window(T)(S).

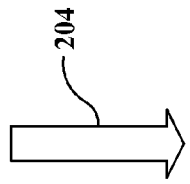
204

206

SQL Representation of CQL operator

Let S' be the SQL representation of the input stream S. The SQL representation of R is computed as follows:

For each t that is an element of $\mathcal{T}$,
INSERT INTO R'
    SELECT s, '+', t FROM S' WHERE f(s, t) > 0
    UNION
    SELECT s, '-', (t + T) FROM S' WHERE f(s, t) > 0

410
represent at least one CQL concept as a SQL table, each of the at least one CQL concepts being a CQL table, a CQL stream, or a CQL relation

420
translate a CQL operator into at least one SQL statement, wherein input to the CQL operator comprises at least one of the represented CQL concepts, wherein the CQL operator produces at least one of the represented CQL concepts as output, wherein the at least one SQL statement operates on at least one SQL table representing the input to the CQL operator, and wherein the at least one SQL statement produces at least one SQL table representing the output of the CQL operator

520
represent a CQL table as a SQL table, the CQL table having a schema K and a defining function f, the SQL table having schema K and defining function f, and the SQL table containing f(s) rows of s for any s that is an element of K

530
represent a CQL stream as a SQL table, the CQL stream having a schema K, a time-domain TD, and a defining function f, wherein the SQL table contains f(s, t) rows of (s, t) for any (s, t) that is an element of K x TD

540

542
represent a CQL relation R having a schema K and a time-domain TD as a CQL table T according to the formula $$T = \bigcup_{L \geq t \geq 0} T_t,$$

where L is a limit of time, $T_t$ is a CQL table having a schema K2 equal to K x {+, -} x {t} and a defining function f where $$f \equiv \begin{cases} T_0 = R(0) \times \{+\} \times \{0\} \\ T_t = ((R(t) - R(t-1)) \times \{+\} \times \{t\}) \cup ((R(t-1) - R(t)) \times \{-\} \times \{t\}) \end{cases}$$

544
represent the CQL table T having the schema K2 and defining function f as a SQL table, wherein the SQL table contains f(s) rows of s for any s that is an element of K2

610
represent at least one CQL concept as a SQL table, each of the at least one CQL concepts being a CQL table, a CQL stream, or a CQL relation

620
translate a CQL operator into at least one SQL statement, wherein input to the CQL operator comprises at least one of the represented CQL concepts, wherein the CQL operator produces at least one of the represented CQL concepts as output, wherein the at least one SQL statement operates on at least one SQL table representing the input to the CQL operator, and wherein the at least one SQL statement produces at least one SQL table representing the output of the CQL operator

630

632
receive, in a first computing environment, input to the CQL operator

634
provide the received input to a SQL table in a second computing environment

636
execute, in the second computing environment, the at least one SQL statement

640
produce an SQL table representing output of the CQL operator

650
retrieve, in the first computing environment, output of the CQL operator from the SQL table representing the output

*FIG. 6*

IMPLEMENTING EVENT PROCESSORS

FIELD OF THE INVENTION

The present disclosure relates generally to event-processing systems. For example, embodiments of inventive matter disclosed herein provide for implementations of event processors designed in Continuous Query Language ("CQL") that comprise a network of CQL operators.

BACKGROUND OF THE INVENTION

Many business enterprises use computer systems to monitor and process business activities and transactions. Business entities that handle complex transactions and activities, in particular, often employ distributed computer systems.

Conventional database systems and business data processing algorithms emphasize a passive repository storing a large collection of data elements and perform human initiated queries and transactions on such a repository. Such conventional technology emphasizes the importance of the current state of the data. Hence, current values of the data elements can be easy to obtain, while previous values can only be found by decoding database log files. This conventional technology also treats notifications and triggers with low priority, and these constructs are added mostly as an after thought to the current systems. Conventional technology also assumes that data elements are synchronized and that queries have exact answers. In many stream-oriented applications, data arrives asynchronously and answers must be computed with incomplete information.

There is a substantial class of applications where data takes the form of continuous data streams rather than finite stored data sets, and where clients require long-running continuous queries rather than one-time queries. These applications include network monitoring, telecommunication data management, sensor networks, manufacturing, and others. The traditional database systems and business data processing algorithms are not well equipped to support these kinds of applications. Business enterprises implement event-processing systems to support these kinds of applications.

SUMMARY OF THE INVENTION

CQL is a Continuous Query Language for registering continuous queries against streams and updateable relations. Event processors ("EPs") can be implemented as a network of CQL operators. The phrase "event processor," unless herein expressly stated otherwise, will herein mean a network of CQL operators. One approach in the prior art is to implement event processors comprising a network of CQL operators in the C++ programming language. That is, a creator of an event processor can write the event processors in CQL and then the resulting CQL code is executed by a CQL engine or a virtual machine implemented in the C++ programming language.

Inventive matter discussed herein deviates with respect to and improves upon technology known in the prior art. Embodiments disclosed herein provide for implementations of event processors created as a network of CQL operators. Although the inventive matter disclosed herein will be discussed in some detail in relation to implementing event processors, it should be understood that inventive matter disclosed herein also can be advantageously used in implementing other applications designed in or written in CQL. In accordance with embodiments disclosed herein, event processors are implemented in Structured Query Language ("SQL"). Implementing an event processor in SQL allows the leveraging of significant industry knowledge and experience in research and development of SQL engines.

In particular embodiments, a user can interact with an EP-generator application to design an event processor in CQL. The EP-generator application can implement the event processor by translating the CQL into SQL code. Event-processing systems described herein can execute the SQL implementation of the event processor in a computing environment design to execute SQL efficiently, such as an SQL database. In this manner, systems described herein can execute event processors defined as a network of CQL operators with high performance and scalability. The event processor executing in one computing environment (e.g., a SQL database environment) can interact with software components executing in a different computing environment, such as a Java Business Integration ("JBI") environment. For example, service engines and binding components executing in the JBI environment can provide input to and receive output from the event processor executing in a SQL database environment.

It is to be understood that the inventive matter disclosed herein may be embodied strictly as a software program, as software and hardware, or as hardware alone. The features disclosed herein may be employed in workstations and other computerized devices and software systems for such devices such as those manufactured by SUN Microsystems, Inc., of Santa Clara, Calif. For example, inventive matter disclosed herein can be advantageously utilized in developing JBI components such as an Intelligent Event Processor ("IEP").

BRIEF DESCRIPTION OF THE DRAWINGS

Objects, features, and advantages of inventive matter disclosed herein may be better understood by referring to the following description of example embodiments in conjunction with the accompanying drawings, in which like reference characters indicate like structural elements and features in the various figures. The drawings are not meant to limit the scope of the invention. For clarity, not every element may be labeled in every figure. The drawings are not necessarily to scale, emphasis instead being placed upon illustrating embodiments, principles, and concepts.

FIG. 2 illustrates an example translation representing a particular CQL operator as a group of SQL statements.

FIG. 4 illustrates procedures performable by an EP-generator application in accordance with embodiments disclosed herein.

FIG. 5 illustrates additional procedures performable by an EP-generator application in accordance with embodiments disclosed herein.

FIG. 6 illustrates additional procedures performable by an EP-generator application in accordance with embodiments disclosed herein.

DESCRIPTION OF EXAMPLE EMBODIMENTS

Figure 1:
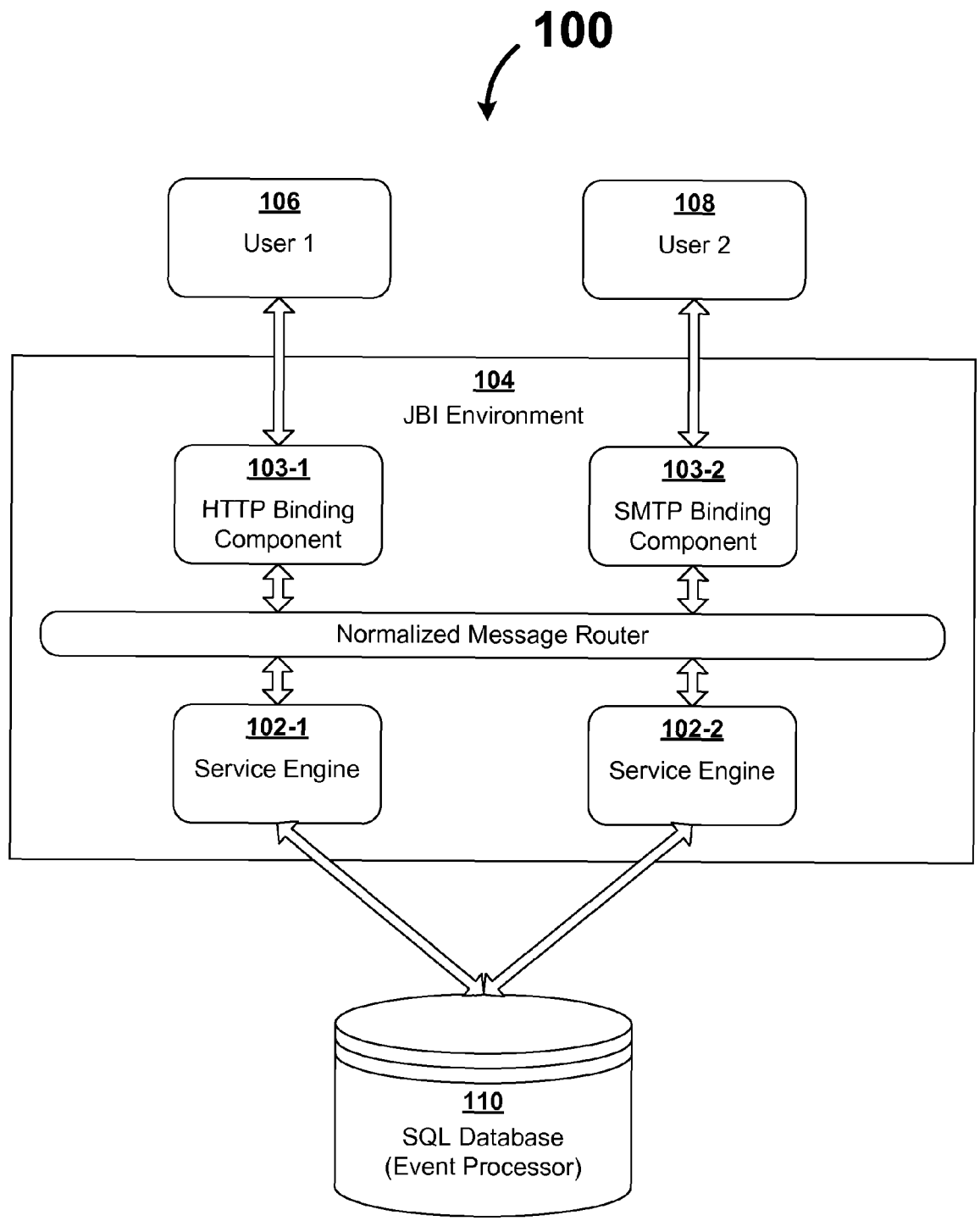
FIG. 1 illustrates an example embodiment of an event-processing environment in accordance with embodiments disclosed herein.

FIG. 1 illustrates an example embodiment of an event-processing environment 100 in accordance with embodiments disclosed herein. The event-processing environment 100 includes two service engines 102-1, 102-2 (collectively 102) and two binding components 103-1, 103-2 (collectively 103). The service engines 102 and binding components 103 execute in a first computing environment, which is a JBI environment 104. The service engines 102 and binding components 103 may receive input from or provide output to each of two users 106, 108. The service engines 102 and binding components 103 are integrated into the JBI environment 104 and can provide real-time business event collection, real-time business event processing, and real-time event delivery. The service engines 102 and binding components 103 can provide input to and can receive output from one or more event processors. The event processors have two types of input: stream input and table input. Event processors are designed in CQL and implemented in SQL in accordance with embodiments disclosed herein. The SQL implementation of an event processor executes in a second computing environment, which is a SQL Database environment 110. The SQL Database environment 110 includes SQL tables and statements representing the event processor as described herein.

Continuous Query Language (CQL)

CQL was developed by research scientists at Stanford University for registering continuous queries against streams and updateable relations. Definitions and descriptions of basic CQL concepts (e.g., CQL tables, CQL streams, and CQL relations) are provided herein. Unless expressly stated otherwise herein, N represents the set of all non-negative integers, and T represents a discrete ordered time domain. t is called a time instant if t ∈ T.

Definition. Multiset

Given a set X, a multiset over X is a pair $<X, f>$ where f: X→N, that is, f is a function that maps X to N. f is called the defining function of multiset $<X, f>$. For example, let X={a, b, c, . . . , z}, then multiset [a, a, a, b, c, c] can be defined as $<X, f>$ where $$f(x) = \begin{cases} 3 & \text{if } x = a \\ 1 & \text{if } x = b \\ 2 & \text{if } x = c \\ 0 & \text{otherwise} \end{cases}.$$

Definition. Cardinality of a Multiset

Let A=$<X, f>$ be a multiset, then the cardinality of A, denoted as card(A), is defined as $$\sum_{x \in X} f(x).$$

That is, the total counts of all elements of A. A is called a finite multiset if card(A)<∝. For example, card([a,a,a,b,c,c])=3+1+2=6, hence [a,a,a,b,c,c] is a finite multiset.

Definition. Multi-Intersection

Let A=$<X, f>$ be a multiset, and Y⊆X, then the multi-intersection of A over Y, denoted as A ⊗ Y, is defined as multiset B=$<X, g>$ where $$g(x) \equiv \begin{cases} f(x) & \text{if } x \in Y \\ 0 & \text{otherwise} \end{cases}.$$

for any x ∈ X. For example, [a, a, a, b, c, c] ⊗ {a, b}=[a, a, a, b].

Definition. Multiset Operations

Let A=$<X, f>$, and B=$<X, g>$ be multisets, and V be a set then

1. A+B is defined as $<X, h>$ where h(x)=f(x)+g(x) for any x ∈ X.
2. A−B is defined as $<X, h>$ where h(x)=min(f(x)−g(x), 0) for any x ∈ X.
3. A∪B is defined as $<X, h>$ where h(x)=max(f(x), g(x)) for any x ∈ X.
4. A∩B is defined as $<X, h>$ where h(x)=min(f(x), g(x)) for any x ∈ X.
5. A×V is defined as $<X×V, h>$ where h(x, v)=f(x) for any x ∈ X and v ∈ V.

For example, let A=[a, a, b, c], B=[a, b, b, c, d], and V={u, v}, then

1. A+B=[a,a,a,b,b,b,c,c,d]
2. A−B=[a]
3. A∪B=[a, a, b, b, c, d]
4. A∩B=[a,b,c]
5. A×V=[(a, u), (a, u), (b, u), (c, u), (a, v), (a, v), (b, v), (c, v)].

Definition. Schema

A schema K is defined as $$\prod_{i=1}^{m} K_i$$

where $K_i$ is a set for $1 \leq i \leq m$. For example, let $K_1$ be the set of all character sequences whose length ≤10, and $K_2$ be the set of all floating numbers, $$K = \prod_{i=1}^{2} K_i$$

defines a two-column schema: (column1, varchar, 10), and (column2, float).

Definition. Stream

A multiset S=$<K×T, f>$ is called a stream with schema K, and time-domain T if $$\sum_{s \in S} f(s, t) < \infty$$

for any t ∈ T. That is, S is a multiset of elements (s, t) where s is called an element of S, and t is called the timestamp of s, and there cannot be infinite number of elements of S with a given timestamp. S[≤t], read as S up to t, is defined as S ⊗ (K×(−∞, t]). For example, let $$K = \prod_{i=1}^{2} K_i$$

where $K_1$ is the set of all character sequences whose length ≤10, and $K_2$ is the set of all floating numbers, and let S be the collection of all transactions from a stock exchange, then S can be defined as $<K×T, f>$ where f (s1,s2,t) is the count of transactions whose symbol equals s1, price=s2, and timestamp equals t for any (s1, s2, t) ∈ K×T. Since there cannot be an infinite number of transactions with the same stock symbol and price at any given time, S is a stream.

Definition. Relation

R is called a relation with schema K and time-domain T if R: T→{A|A is a finite multiset over K}. That is, R is a map from time-domain T to the set of all finite multisets over K. R(t) is called an instantaneous relation over schema K at time t. R is called monotonic if $t_1 \leq t_2 \Rightarrow R(t_1) \subseteq R(t_2)$. For example, let $$K = \prod_{i=1}^{2} K_i$$

where $K_1$ is the set of all character sequences whose length ≦10, and $K_2$ is the set of all floating numbers, then for any t ∈ T define R(t) as the multiset of those transactions that happen between t−10, and t. Since there cannot be an infinite number of transactions that happen between t−10 and t for any t ∈ T, R is a Relation.

Definition. Table

T is called a table with schema K if T is a finite multiset over K. Let R be a relation over K, then R(t) is a table for any t ∈ T.

Definition. Stream-To-Relation Operator

A stream-to-relation operator takes a stream S as input, and produces a relation R as output with the same schema as S. Let S=<K×T, f> be a stream with schema K and time-domain T.

1. Time based window: let T be a time-period over T, the time based window of size T, denoted as time-based-window(T), is a stream-to-relation operator such that time-based-window(T)(S)(t)=<K, $g_t$> for any t ∈ T where $g_t(s) \equiv \sum_{\tau \in [max(t-T,0),t]} f(s, \tau)$ for any $s \in K$.

2. Tuple based window: let n ∈ N, the tuple based window of size n, denoted as tuple-based-window(n), is a stream-to-relation operator such that tuple-based-window(n)(S)(t)=the multiset that consists of the n elements of S[≦t] with the largest timestamps (or all elements of S if card (S[≦t])≦n).

3. Partitioned window: let n ∈ N, $$K = \prod_{i=1}^{m} K_i,$$

and $1 \leq m_1 < \ldots < m_l \leq m$, the partitioned window O over attribute $K_{m_1}, \ldots, K_{m_l}$ of size n, denoted as partitioned-window $$\left(\prod_{i=1}^{l} K_{m_i}, n\right)$$

is a stream-to-relation operator such that partitioned-window $$\left(\prod_{i=1}^{l} K_{m_i}, n\right)$$

(S)(t)=<K, $g_t$> where $$g_t(s) = \sum_{(a_{m_1}, \ldots, a_{m_l}) \in K_{m_1} \times \ldots \times K_{m_l}} g_{a_{m_1}, \ldots, a_{m_l}, t}(s)$$

for any s ∈ K, and any t ∈ T, and $g_{a_{m_1}, \ldots, a_{m_l}, t}$ is the defining function of multiset:

tuple-based-window(n)(S ⊗ {($s_1, \ldots, s_m, \tau$) ∈ K×T|$s_{m_i} = a_{m_i}$ for $1 \leq i \leq l$})(t). That is, partitioned-window $$\left(\prod_{i=1}^{l} K_{m_i}, n\right)$$

partitions a stream S into $$\left|\prod_{i=1}^{l} K_{m_i}\right|$$

different substreams, one stream for each $(a_{m_1}, \ldots, a_{m_l})$ $$\in \prod_{i=1}^{l} K_{m_i},$$

applies tuple-based-window(n) on each substream, then merges the resulting relations to produce the output relation.

Definition. Relation-To-Stream Operator

A relation-to-stream operator takes a relation R as input, and produces a stream S as output with the same schema as R. Let R be a relation with schema K and time-domain T.

1. Input stream: the input stream operator, denoted as input-stream, is a relation-to-stream operator such that input-stream $$(R) = \bigcup_{t \geq 0} ((R(t) - R(t-1)) \times \{t\})$$

where R(−1) is the empty set. That is, for any t ∈ T. the input stream operator takes those elements in R(t) but not in R(t−1), timestamps them with t, and puts them into the output stream.

2. Delete stream: the delete stream operator, denoted as delete-stream, is a relation-to-stream operator such that delete-stream $$(R) = \bigcup_{t \geq 0} ((R(t-1) - R(t)) \times \{t\})$$

where R(−1) is the empty set. That is, for any t ∈ T, the delete stream operator takes those elements in R(t−1) but not in R(t), timestamps them with t, and puts them into the output stream.

3. Relation stream: the relation stream operator, denoted as relation-stream, is a relation-to-stream operator such that relation-stream $$(R) = \bigcup_{t \geq 0} (R(t) \times \{t\}).$$

That is, for any t ∈ T, the relation stream operator takes those elements in R(t), timestamps them with t, and puts them into the output stream.

Definition. Relation-To-Relation Operator

Assume that O is a SQL operator or query over tables $T_1, \ldots, T_m$ where $T_i$ has schema $K_i$ for $1 \leq i \leq m$, and $R_1, \ldots, R_m$ are relations over time domain T where $R_i$ has schema $K_i$, the relation to relation operator corresponding to O, denoted as relation-to-relation(O), is defined as relation-to-relation(O)(t)=O($R_1$(t), ..., $R_m$(t)) for any t ∈ T.

Implementing CQL in SQL

In accordance with embodiments disclosed herein, the CQL concepts of table, stream, and relation are mapped into SQL concepts. A CQL table T=<K, f> can be represented as a SQL table. The SQL table has schema K, where K is also T's schema, and defining function f. The SQL table contains f(s) rows of s for any s ∈ K.

A CQL stream S=<K×T, f> can be represented as a SQL table. Such an SQL table T has schema K×T, where K is also S's schema, T is the time-domain, and f is the defining function. Table T contains f(s, t) rows of (s, t) for any (s, t) ∈ K×T.

A CQL relation R with schema K and time-domain T can be represented as a SQL table. First the CQL relation R can be represented as a CQL table $$T = \bigcup_{L \geq t \geq 0} T,$$

where L is the practical limit of time, and $T_t$ is a CQL table with schema K×{+, −}×{t} and is defined as follows:

$T_0 = R(0) \times \{+\} \times \{0\}$ $T_t = ((R(t)-R(t-1)) \times \{+\} \times \{t\}) \cup ((R(t-1)-R(t)) \times \{-\} \times \{t\})$.

Second, the CQL table T can be represented as a SQL table and, thus, the SQL table is also a representation of the CQL relation R. It should be noted that (s, +, t) ∈ T if and only if s ∈ R(t)−R(t−1), and (s, −, t) ∈ T if and only if s ∈ R(t−1)−R(t), where R(−1) is the empty set.

Using the above-described representations for CQL streams, CQL relations, and CQL tables, embodiments described herein can represent a CQL operator as one or more SQL statements. Thus, a CQL operator that takes CQL streams, relations, and/or tables, and computes a CQL stream, relation, or table can be represented as a group of SQL statements that takes SQL tables corresponding to the input CQL streams, relations, and/or tables, and computes the SQL table corresponding to the output CQL stream, relation, or table. Using the representation of CQL concepts as discussed herein, one of ordinary skill in the art in query languages will be able to produce a group of SQL statements representing a CQL operator without undue experimentation. As is typical in the art of computer programming, a group of statements written in a particular programming language to represent a programming construct will generally not be unique. Thus, it should be noted that the group of SQL statements that represents a CQL operator may not be unique because there may be many ways to compute a table out of a collection of tables. That is, different programmers may produce different SQL statements for representing the same CQL operator.

FIG. 2 illustrates an example translation 200 representing a particular CQL operator 202 as a group of SQL statements. The CQL operator 202 is time-based-window(T) where T is a time period over T. The CQL operator 202 takes a CQL stream S, having schema K and time domain T, as input and computes a relation R such that R=time-based-window(T)(S). In accordance with the translation 200, the CQL operator 202 is translated 204 into an SQL representation 206 of the CQL operator 202. In the SQL representation 206 of the CQL operator 204, S' is the SQL representation of the CQL stream S. The SQL representation 206 includes a group of SQL statements that computes the SQL representation R' of the CQL relation R.

Figure 3:
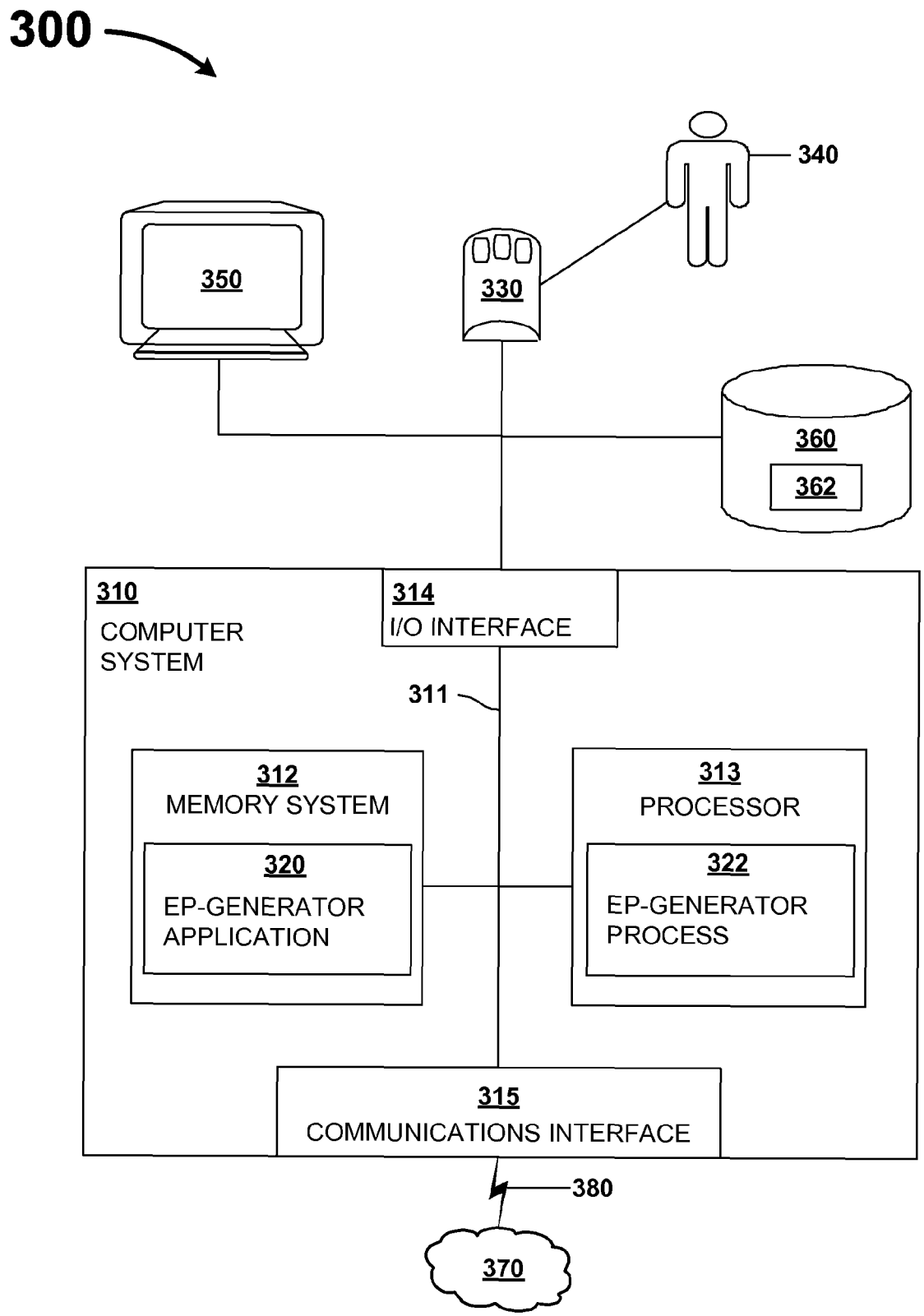
FIG. 3 is a block diagram of a computer environment illustrating an example architecture of a respective computer system useful for implementing an event processor according to embodiments disclosed herein.

FIG. 3 is a block diagram of a computing environment 300 illustrating an example architecture of a respective computer system 310 useful for implementing an EP-generator application 320 according to embodiments disclosed herein. Computer system 310 can be a computerized device such as a personal computer, workstation, portable computing device, console, network terminal, processing device, etc. As shown, computer system 310 of the present example includes an interconnect 311, such as a data bus or other circuitry, that couples a memory system 312, a processor 313, I/O interface 314, and a communications interface 315. An input device 330 (e.g., one or more user/developer-controlled devices such as a keyboard, mouse, touchpad, trackball, etc.) couples to the processor 313 through the I/O interface 314 and enables a user 340, such as a developer of an event processor, to provide input commands and generally interact with a graphical user interface that the EP-generator application 320 and the EP-generator process 322 provide on a display 350. I/O interface 314 potentially provides connectivity to peripheral devices such as the input device 330, display screen 350, storage device 360, etc. The computer environment 300 includes a storage device 360 that can be used for storing one or more files 362. The files 362 may contain, for example, programming constructs designed in CQL such as previously designed event processors and SQL implementations of various CQL constructs such as CQL operators or event processors.

Communications interface 315 enables computer system 310 to communicate with network 370 over the communication link 380 to retrieve and transmit information from remotely located sources if necessary. For example, the computer system 310 may be communicatively connected via the communication link 380 to a computer system on the network 370 that will execute event processors implemented on the computer system 310. In this manner, SQL implementations of CQL constructs can be transferred from the computing environment 300 to a second computing environment, such as the SQL Database environment 110 shown in FIG. 1, so that the SQL implementation can be executed in the second computing environment.

As shown, memory system 312 can be any type of computer-readable medium and in this example is encoded with EP-generator application 320 that supports functionality as herein described. EP-generator application 320 can be embodied as computer software code such as data and/or logic instructions (e.g., code stored in the memory or on another computer-readable medium such as a disk) that supports processing functionality according to different embodiments described herein. During operation of the computer system 310, processor 313 accesses the memory system 312 via the interconnect 311 in order to launch, run, execute, interpret, or otherwise perform the logic instructions of the EP-generator application 320. Execution of the EP-generator application 320 produces processing functionality in an EP-generator process 322. In other words, the EP-generator process 322 represents one or more portions of the EP-generator application 320 performing within or upon the processor 313 in the computer system 310. Those skilled in the art will understand that the computer system 310 can include other processes and/or software and hardware components, such as an operating system that controls allocation and use of hardware resources.

It should be noted that, in addition to the EP-generator process 322 that carries out method operations as discussed herein, other embodiments herein include the EP-generator application 320 itself (i.e., the un-executed or non-performing logic instructions and/or data). The EP-generator application 320 may be stored on a computer-readable medium such as a floppy disk, hard disk, or in an optical medium. According to other embodiments, the EP-generator application 320 can also be stored in a memory type system such as in firmware, read-only memory (ROM), or, as in this example, as executable code within the memory system 312 (e.g., within Random Access Memory or RAM). Thus, it should be understood that embodiments disclosed herein include logic encoded in one or more tangible media for execution and, when executed, operable to perform methods and processes disclosed herein. Such logic may be embodied strictly as computer software, as computer software and hardware, or as hardware alone.

Functionality supported by computer system 310 and, more particularly, functionality associated with EP-generator application 320 and EP-generator process 322 is herein discussed in relation to FIGS. 4-6. For purposes of the following discussion, computer system 310 (e.g., EP-generator application 320 and/or EP-generator process 322) generally performs procedures in FIGS. 4-6. However, other systems can be configured to provide similar functionality.

FIG. 4 illustrates procedures 400 performable by an EP-generator application 320 in accordance with embodiments disclosed herein. The procedures 400 comprise steps 410 and 420, which the EP-generator application 320 is not required to execute sequentially. For example, the EP-generator application may begin executing step 420 prior to completing the execution of step 410.

In step 410, the EP-generator application 320 represents at least one CQL concept as a SQL table, each of the at least one CQL concepts being a CQL table, a CQL stream, or a CQL relation. The EP-generator application 320 can use techniques described herein to electronically perform step 410. In particular embodiments, the EP-generator application 320 represents the CQL concepts by creating a SQL table in a database, such as a database in the database environment 110 of FIG. 1. In these embodiments, the representations are embodied in the SQL tables themselves. In other embodiments, the EP-generator application 320 may produce SQL statements that embody the representations and can be executed to create the SQL tables. In step 420, the EP-generator application 320 translates a CQL operator into at least one SQL statement, wherein input to the CQL operator comprises at least one of the represented CQL concepts (i.e., a CQL table, a CQL stream, or a CQL relation), wherein the CQL operator produces at least one of the represented CQL concepts as output, wherein the at least one SQL statement operates on at least one SQL table representing the input to the CQL operator, and wherein the at least one SQL statement produces at least one SQL table representing the output of the CQL operator.

FIG. 5 illustrates additional procedures 510 performable by an EP-generator application 320 in accordance with embodiments disclosed herein. The procedures 510 comprises steps 520, 530, and 540. The procedures 510 comprise a particular embodiment of the procedure 410 shown in FIG. 4.

In step 520, the EP-generator application 320 represents a CQL table as a SQL table. The CQL table has a schema K and a defining function f. The SQL table also has a schema K and defining function f. The SQL table containing f(s) rows of s for any s that is an element of K.

In step 530, the EP-generator application 320 represents a CQL stream as a SQL table. The CQL stream has a schema K, a time-domain TD, and a defining function f. The SQL table contains f(s, t) rows of (s, t) for any (s, t) that is an element of K×TD.

In step 540, the EP-generator application 320 represents a CQL relation as a SQL table. Step 540 comprises steps 542 and 544.

In step 542, the EP-generator application 320 represents a CQL relation R having a schema K and a time-domain TD as a CQL table T according to the formula $$T = \bigcup_{L \geq t \geq 0} T_t,$$

where L is a limit of time, $T_t$ is a CQL table having a schema K2 equal to $K \times \{+, -\} \times \{t\}$ and a defining function f where $$f \equiv \begin{cases} T_0 = R(0) \times \{+\} \times \{0\} \\ T_t = ((R(t) - R(t-1)) \times \{+\} \times \{t\}) \cup ((R(t-1) - R(t)) \times \{-\} \times \{t\}) \end{cases}.$$

In step 544, the EP-generator application 320 represents the CQL table T having the schema K2 and defining function f as a SQL table, wherein the SQL table contains f(s) rows of s for any s that is an element of K2.

FIG. 6 illustrates additional procedures 600 performable by an EP-generator application 320 in accordance with embodiments disclosed herein. Procedures 600 comprise steps 610, 620, and 630.

In step 610, the EP-generator application 320 represents at least one CQL concept as a SQL table, each of the at least one CQL concepts being a CQL table, a CQL stream, or a CQL relation. Step 610 can be the same as step 410 of FIG. 4.

In step 620, the EP-generator application 320 translates a CQL operator into at least one SQL statement, wherein input to the CQL operator comprises at least one of the represented CQL concepts (i.e., a CQL table, a CQL stream, or a CQL relation), wherein the CQL operator produces at least one of the represented CQL concepts as output, wherein the at least one SQL statement operates on at least one SQL table representing the input to the CQL operator, and wherein the at least one SQL statement produces at least one SQL table representing the output of the CQL operator. Step 620 can be the same as step 420 of FIG. 4.

In step 630, the at least one SQL statement is executed in a second computing environment. Step 630 comprises steps 632, 634, and 636.

In step 632, input to the CQL operator is received in a first computing environment. For example, a service engine 102, as shown in FIG. 1, may receive, in the JBI environment 104, the input from one of users 106, 108. Alternately, a service engine 102 may receive the input from another service engine 102.

In step 634, the input received in step 632 is provided to a SQL table in a second computing environment. For example, a service engine 102 may provide the input to a SQL table in the SQL Database 110 of FIG. 1. The SQL table represents the input to the CQL operator and may be created by step 410, step 510, or step 610. The service engine 102 may provide the input to the SQL by adding data to an existing SQL table.

In step 636, the at least one SQL statement is executed in the second computing environment. For example, the SQL Database 110 may execute the SQL implementation of the CQL operator. The executing at least one SQL statement operates on the SQL table to which the input is provided in step 634. The executing at least one SQL statement produces a SQL table representing the output of the CQL operator. Thus, in step 640, a SQL table representing the output of the CQL operator is produced in the second computing environment. The SQL table may be produced by adding data to an existing SQL table.

In step 650, the results of executing the at least one SQL statement in the second computing environment are received in the first computing environment. For example, a service engine 102 may retrieve the results by retrieving data from the SQL table produced in step 640.

In accordance with embodiments described herein, novel techniques for implementing event processors are provided. While inventive matter has been shown and described herein with reference to specific embodiments thereof, it should be understood by those skilled in the art that variations, alterations, changes in form and detail, and equivalents may be made or conceived of without departing from the spirit and scope of the inventive matter. The foregoing description of the inventive matter is not intended to limit the present invention. Rather, the scope of the present invention should be assessed as that of the appended claims and by equivalents thereof.

What is claimed is:

1. A method comprising:
representing at least one continuous-query-language ("CQL") concept as a Structured Query Language ("SQL") table, the at least one CQL concepts being a CQL table, a CQL stream, or a CQL relation;
translating a CQL operator into at least one SQL statement, wherein input to the CQL operator comprises at least one of the represented CQL concepts, wherein the CQL operator produces at least one of the represented CQL concepts as output, wherein the at least one SQL statement operates on at least one SQL table representing the input to the CQL operator, and wherein the at least one SQL statement produces at least one SQL table representing the output of the CQL operator; and
representing a CQL relation R having a schema K and a time-domain TD as a CQL table T according to the formula $$T = \bigcup_{L \geq t \geq 0} T_t,$$

where L is a limit of time, $T_t$ is a CQL table having a schema K2 equal to $K \times \{+, -\} \times \{t\}$ and a defining function f where $$f \equiv \begin{cases} T_0 = R(0) \times \{+\} \times \{0\} \\ T_t = ((R(t) - R(t-1)) \times \{+\} \times \{t\}) \cup ((R(t-1) - R(t)) \times \{-\} \times \{t\}) \end{cases} ; \text{ and}$$

representing the CQL table T having the schema K2 and defining function f as a SQL table, wherein the SQL table contains f(s) rows of s for any s that is an element of K2.

2. The method of claim 1, comprising:
receiving, in a first computing environment, input to the CQL operator;
providing the received input to a SQL table in a second computing environment; and
executing, in the second computing environment, the at least one SQL statement.

3. The method of claim 2, wherein the executing step comprises:
producing an SQL table representing output of the CQL operator.

4. The method of claim 3, comprising:
retrieving, in the first computing environment, output of the CQL operator from the SQL table representing the output.

5. The method of claim 1, wherein representing a CQL table comprises:
representing a CQL table as a SQL table, the CQL table having a schema K and a defining function f, the SQL table having schema K and defining function f, and the SQL table containing f(s) rows of s for any s that is an element of K.

6. The method of claim 1, wherein representing a CQL stream comprises:
representing a CQL stream as a SQL table, the CQL stream having a schema K, a time-domain TD, and a defining function f, wherein the SQL table contains f(s, t) rows of (s, t) for any (s, t) that is an element of K×TD.

7. Software stored in one or more computer-readable media, the software being able, when executed, to perform a method comprising: representing a CQL table as a SQL table; representing a CQL stream as a SQL table;
representing a CQL relation as a SQL table;
translating a CQL operator directly into at least one SQL statement,
wherein input to the CQL operator comprises a CQL table, a CQL stream, or a CQL relation, wherein the CQL operator produces output comprising a CQL table, a CQL stream, or a CQL relation, wherein the at least one SQL statement operates on at least one SQL table representing the input to the CQL operator, and wherein the at least one SQL statement produces at least on SQL table representing the output of the CQL operator; and
wherein representing a CQL relation comprises:
representing a CQL relation R having a schema K and a time-domain TD as a CQL table T according to the formula $$T = \bigcup_{L \geq t \geq 0} T_t,$$

where L is a limit of time, $T_t$ is a CQL table having a schema K2 equal to $K \times \{+,-\} \times \{t\}$ and a defining function f where $$f \equiv \begin{cases} T_0 = R(0) \times \{+\} \times \{0\} \\ T_t = ((R(t) - R(t-1)) \times \{+\} \times \{t\}) \cup ((R(t-1) - R(t)) \times \{-\} \times \{t\}) \end{cases} ; \text{and}$$

representing the CQL table T having the schema K2 and defining function f as a SQL table, wherein the SQL table contains f(s) rows or s for any s that is an element of K2.

8. The software of claim 7, wherein the method comprises:
receiving, in a first computing environment, input to the CQL operator;
providing the received input to a SQL table in a second computing environment; and
executing, in the second computing environment, the at least one SQL statement.

9. The software of claim 8, wherein the executing step comprises:
producing an SQL table representing output of the CQL operator.

10. The software of claim 9, wherein the method comprises:
retrieving, in the first computing environment, output of the CQL operator from the SQL table representing the output.

11. The software of claim 7, wherein representing a CQL table comprises:
representing a CQL table as a SQL table, the CQL table having a schema K and a defining function f, the SQL table having schema K and defining function f, and the SQL table containing f(s) rows of s for any s that is an element of K.

12. The software of claim 7, wherein representing a CQL stream comprises:
representing a CQL stream as a SQL table, the CQL stream having a schema K, a time-domain TD, and a defining function f, wherein the SQL table contains f(s, t) rows of (s, t) for any (s, t) that is an element of K×TD.

13. An apparatus comprising:
a processor;
a memory unit that stores instructions associated with an application executable by the processor; and
an interconnect coupling the processor and the memory unit, enabling the apparatus to execute the application and perform a method comprising:
representing a CQL table as a SQL table;
representing a CQL stream as a SQL table;
representing a CQL relation as a SQL table;
translating a CQL operator into at least one SQL statement, wherein the translating is implemented using only SQL code, wherein input to the CQL operator comprises a CQL table, a CQL stream, or a CQL relation, wherein the CQL operator produces output comprising a CQL table, a CQL stream, or a CQL relation, wherein the at least one SQL statement operates on at least one SQL table representing the input to the CQL operator; and
wherein the at least one SQL statement produces at least on SQL table representing the output of the CQL operator; and
wherein representing a CQL relation comprises:
representing a CQL relation R having a schema K and a time-domain TD as a CQL table T according to the formula $$T = \bigcup_{L \geq t \geq 0} T_t,$$

where L is a limit of time, $T_t$ is a CQL table having a schema K2 equal to $K \times \{+, -\} \times \{t\}$ and a defining function f where $$f \equiv \begin{cases} T_0 = R(0) \times \{+\} \times \{0\} \\ T_t = ((R(t) - R(t-1)) \times \{+\} \times \{t\}) \cup ((R(t-1) - R(t)) \times \{-\} \times \{t\}) \end{cases} ; \text{and}$$

representing the CQL table T having the schema K2 and defining function f as a SQL table, wherein the SQL table contains f(s) rows of s for any s that is an element of K2.

14. The apparatus of claim 13, wherein the method comprises:
receiving, in a first computing environment, input to the CQL operator;
providing the received input to a SQL table in a second computing environment; and
executing, in the second computing environment, the at least one SQL statement.

15. The apparatus of claim 14, wherein the executing step comprises:
producing an SQL table representing output of the CQL operator.

16. The apparatus of claim 15, wherein the method comprises:
retrieving, in the first computing environment, output of the CQL operator from the SQL table representing the output.

17. The apparatus of claim 13, wherein representing a CQL table comprises:
representing a CQL table as a SQL table, the CQL table having a schema K and a defining function f, the SQL table having schema K and defining function f, and the SQL table containing f(s) rows of s for any s that is an element of K.

18. The apparatus of claim 13, wherein representing a CQL stream comprises:
representing a CQL stream as a SQL table, the CQL stream having a schema K, a time-domain TD, and a defining function f, wherein the SQL table contains f(s, t) rows of (s, t) for any (s, t) that is an element of K×TD.

* * * * *

UNITED STATES PATENT AND TRADEMARK OFFICE
CERTIFICATE OF CORRECTION

PATENT NO. : 7,870,167 B2
APPLICATION NO. : 11/938036
DATED : January 11, 2011
INVENTOR(S) : Yanbing Lu et al.

It is certified that error appears in the above-identified patent and that said Letters Patent is hereby corrected as shown below:

Column 12, Line 7, Claim 1:
Delete:

" $f \equiv \begin{cases} T_0 = R(0)x\{+\}x\{0\} \\ T_t = \{(R(t)-R(t-1))x\{+\}x\{t\}\} \cup \{(R(t-1)-R(t))x\{-\}x\{t\}\} \end{cases}$ ,"

and insert:

-- $f \equiv \begin{cases} T_0 = R(0)x\{+\}x\{0\} \\ T_t = \{(R(t)-R(t-1))x\{+\}x\{t\}\} \cup \{(R(t-1)-R(t))x\{-\}x\{t\}\} \end{cases}$ --.

Column 13, Line 6, Claim 7:
Delete:

" $f \equiv \begin{cases} T_0 = R(0)x\{+\}x\{0\} \\ T_t = \{(R(t)-R(t-1))x\{+\}x\{t\}\} \cup \{(R(t-1)-R(t))x\{-\}x\{t\}\} \end{cases}$ ,"

and insert:

-- $f \equiv \begin{cases} T_0 = R(0)x\{+\}x\{0\} \\ T_t = \{(R(t)-R(t-1))x\{+\}x\{t\}\} \cup \{(R(t-1)-R(t))x\{-\}x\{t\}\} \end{cases}$ --.

Column 12, Line 56, Claim 7:
After "produces at least" delete "on" and insert -- one --.

Column 13, Line 11, Claim 7:
After "contains f(s) rows" delete "ors"
and insert -- of s --.

Column 14, Line 1, Claim 13:
After "produces at least" delete "on"
and insert -- one --.

Signed and Sealed this
Fifteenth Day of March, 2011

David J. Kappos
*Director of the United States Patent and Trademark Office*

CERTIFICATE OF CORRECTION (continued)
U.S. Pat. No. 7,870,167 B2

Column 14, Line 20, Claim 13:
Delete:

" $$f \equiv \begin{cases} T_0 = R(0)x\{+\}x\{0\} \\ T_t = ((R(t)-R(t-1))x\{-\}x\{t\}) \cup ((R(t-1)\ R(1))x\{\ \}x\{t\}) \end{cases}$$ ,, and insert:

-- $$f \equiv \begin{cases} T_0 = R(0)x\{+\}x\{0\} \\ T_t = ((R(t)-R(t-1))x\{+\}x\{t\}) \cup ((R(t-1)-R(1))x\{-\}x\{t\}) \end{cases}$$ --.